(12) United States Patent
Barroso et al.

(10) Patent No.: US 10,989,304 B1
(45) Date of Patent: Apr. 27, 2021

(54) COMPRESSION PACKING (71) Applicant: Teadit N.A., Inc., Pasadena, TX (US)

(72) Inventors: Carlos Daniel Braga Girao Barroso, Rio de Janeiro (BR); Christopher Louis Day, Kemah, TX (US); Jose Carlos Carvalho Veiga, Rio de Janeiro (BR); Josmar Baruffaldi Cristello, Rio de Janeiro (BR)

(73) Assignee: TEADIT N.A., INC., Pasadena, TX (US)

( * ) Notice: Subject to any disclaimer, the term of this patent is extended or adjusted under 35 U.S.C. 154(b) by 0 days.

(21) Appl. No.: 16/939,786

(22) Filed: Jul. 27, 2020

(51) Int. Cl.
| *F16J 15/10* | (2006.01) |
| *F16J 15/12* | (2006.01) |
| *F16J 15/22* | (2006.01) |
| *D02G 3/38* | (2006.01) |
| *D02G 3/36* | (2006.01) |
| *D02G 3/32* | (2006.01) |
| *D02G 3/44* | (2006.01) |

(52) U.S. Cl.
CPC ............. *F16J 15/104* (2013.01); *D02G 3/32* (2013.01); *D02G 3/36* (2013.01); *D02G 3/38* (2013.01); *D02G 3/447* (2013.01); *F16J 15/102* (2013.01); *F16J 15/121* (2013.01); *F16J 15/22* (2013.01); *D10B 2101/12* (2013.01)

(58) Field of Classification Search
CPC ........ F16J 15/104; F16J 15/121; F16J 15/102; F16J 15/22; D02G 3/447; D02G 3/38; D02G 3/32; D02G 3/36; D10B 2101/12
See application file for complete search history.

(56) References Cited

U.S. PATENT DOCUMENTS

| 5,472,031 | A | * | 12/1995 | Austin | ................. | B29C 73/166 |
| | | | | | | 137/223 |
| 6,531,217 | B1 | * | 3/2003 | Martin | ...................... | G01T 1/11 |
| | | | | | | 428/364 |
| 2013/0307229 | A1 | | 11/2013 | Veiga et al. | | |
| 2015/0082757 | A1 | * | 3/2015 | Chaen | ................. | B29D 99/005 |
| | | | | | | 55/482 |

* cited by examiner

*Primary Examiner* — James C Yager
(74) *Attorney, Agent, or Firm* — Haynes and Boone, LLP (57) ABSTRACT

A compression packing for sealing near valve stems, pump shafts and similar machine elements. The compression packing includes tracer particles that retain information about the fabrication of the packing which can be used to trace the origin thereof.

18 Claims, 8 Drawing Sheets

COMPRESSION PACKING

FIELD OF THE INVENTION

The present invention relates to a compression packing for sealing near valve stems, pump shafts, and similar machine elements.

BACKGROUND

Mechanical equipment used in the handling of liquids or gases may be subject to leakage problems, for example, near valve stems and pump shafts. The successful use of such equipment to contain and handle fluids requires adequate control of this leakage, and several sealing methods and devices have been used to achieve such leakage control.

Compression packing is one of the most common sealing elements for leakage control used in the refining, chemical, pharmaceutical, marine, pulp and paper industries and other industry segments. Compression packing involves the insertion of packing elements made from soft, pliant materials into the space (i.e., the stuffing box) to seal between a rotating or reciprocating member of a pump or valve and the body of the pump or valve. When bolt stress is transmitted to the compression packing, the materials compress axially and expand radially inside the stuffing box, creating a seal.

Compression packing represents a compromise between leakage control and packing friction. A compression packing that has a sealing surface with a high coefficient of friction will increase the power required to actuate the equipment and halt the equipment actuation in extreme cases. This problem is present in all types of equipment that use compression packings but is critical in control valves, where a quick response time is required.

Because compression packings are used in many different types of equipment under a broad range of conditions, they come in a wide variety of constructions, configurations, materials, dimensions, shapes, and sizes. The following is a description of the most common packing constructions and their characteristics.

A square braid packing is formed by weaving strands of yarns, ribbons, and other various materials, either alone or in combination, over and under other strands running in the same direction. Such processing can yield packings either in a square or a rectangular cross-section. The square braid packings, which are usually soft and pliable and capable of carrying a large percentage of lubricant, are typically used for high-speed rotary service at relatively low pressure. Additionally, the softness of a square braid packing allows for its use on older or worn equipment.

Square braid packings commonly come in nominal sizes of up to 6 mm (¼ inch). A 2-track square braid, in which eight yarns are woven around 4 corner strands into a 2-track plait, may form rougher packings in larger dimensions.

An interbraid packing, also called a cross-braid or diagonal braid packing, is made by weaving yarns, ribbons, and other forms of materials, either alone or in combination, in a crisscross manner from the surface diagonally through the body of the packing. Each strand is strongly locked by other strands, thereby providing an integral structure that resists unraveling. The weaving pattern of such interbraiding evenly distributes the strands throughout the packing and yields a dense, flexible structure that exhibit improved lubricant retention.

For interbraid packings, if a larger cross-section is needed, a 3- or 4-track diagonal braid may be used. The construction of a 3-track braid, which commonly comes in nominal sizes of between 5 and 12 mm (³⁄₁₆ and ½ inch), involves the use of braiding machines having between 12 to 20 carriers. For 4-track braids, which typically come in dimensions from 10 to 80 mm (⅜ to 3 inches), a braiding machine having 24, 32, or more carriers is used.

Braid-over-braid packings are concentric or round braids that include a thin tubular jacket made from yarns, ribbons, and other forms of materials, which is braided around a core material. This type of construction can yield round, square, or rectangular cross-sections.

Like diagonal braid packings, the braid-over-braid packing construction also provides a fine and dense surface structure but is not as abrasion resistant. Several layers of braid-over-braid construction may be braided over a core to increase the packing size or density. Depending on the size of the packing machines, 16, 48, or more carriers may be used. Additionally, core materials can include either parallel or twisted yarns, both of which provide elasticity and flexibility. Cores made from extruded rubber or elastomers may also be used.

The braid-over-braid packings can have rectangular or round cross-sections, in addition to square shapes, depending on the shape of the packing. Large endless concentric packing rings can be produced with special braiding machines where the top of the machine can be split.

Another type of packing construction, known as braid-over-core, involves the braiding of one or more jackets of yarns, ribbons, or other forms of various materials over a core, which may be twisted, knitted, wrapped or extruded. This type of construction can be used to make packings of a variety of densities and cross-sections.

In addition to each packing construction, a combination of two or more packing constructions may be used, known as a combination packing set. Combination packing sets are commonly intended to prevent packing extrusion and consist of adding anti-extrusion rings to both ends of a packing set. These rings resist higher pressures than the packing material between them, thereby preventing extrusion of the packing through the clearances in the stuffing box. One typical combination packing set involving anti-extrusion rings includes carbon filament end rings with flexible graphite rings. End rings made of metal discs or machined plastics, or other similar materials, may also be used.

Die-formed packing comes in a pre-compressed ring form. This type of construction involves the compression of packing materials within a tooling die of a specified size. In this manner, packing materials can be supplied with a specific density and size.

Besides these above packings, there are other types of packing constructions, such as extruded packings, laminated packings, wrapped, rolled and folded packings, molded packings, machined packing rings and flexible graphite tape.

The Environmental Protection Agency (EPA) regulates emissions and air quality in the United States. When the EPA conducted investigations on the sources of fugitive emissions it was determined that the largest source of such emissions was process equipment used in refineries and chemical plants. According to Elliott MacKay, J. (2004), in "*Detection Of Fugitive Emissions From Valve Stems—DC Resistance Response And Gas Adsorption Over Tin Dioxide Mixed With Alumina*", University of British Columbia, it is estimated that valves account for 60% to 85% of such fugitive emissions.

To ensure that such refineries and chemical plants are following the Clean Air Act (CAA) Regulations, the EPA conducts plant audits, and if the plant is found to be exceeding mandated emission limits, the EPA enters into a legally binding consent decree with the offending party. These consent decrees are made publicly available by the EPA on its website. Under a consent decree, the refineries and chemical plants are still allowed to operate, but leak levels are closely monitored and expected to be lowered, and usually certified low emissions technology packings and valves are required. According to Paeffgen N. (2014), Elise, in "*EPA To Review Consent Decrees To Ensure Compliance*", Alston & Bird LLP, as of 2011, 90 percent of the petroleum refining sector was subject to an EPA consent decree.

For a packing to be considered "Certified low Emissions technology", as defined by the EPA in the Enhanced Leak Detection and Repair (LDAR) Program Part G—Equipment Upgrades, Replacement and Improvement, the packing manufacturer must issue a written guarantee that the packing will not leak more than 100 parts per million (ppm) when sealing pressurized volatile organic compounds (VOC), such as methane, for a total of five years. Usually, the guarantee is also backed up by an equivalent document showing that the packing was tested according to generally accepted good engineering practices and standards.

The most common standard used to test packings for low emissions is from the American Petroleum Institute, ("API") 622: Type Testing of Process Valve Packing for Fugitive Emissions, Third Edition. Testing on this standard qualifies the packing, and the test takes place on a standardized test rig and not in an actual valve. During the test, the packing is subject to 1,510 mechanical cycles and 5 thermal cycles, which is considered a good representation of an isolation valve lifecycle. The test rig is pressurized with 40 bar of methane, which is a type of VOC. Leakage cannot exceed 100 ppm at any moment and no retorques are allowed, which matches the LDAR required performance, as mentioned above.

Another standard that is used by the industry is from the International Organization for Standardization, ("ISO") 15848-1 Industrial valves—Measurement, test and qualification procedures for fugitive emissions. This standard qualifies the valve design and has different procedures to account for isolation and control valves. Since it addresses control valves, which are much more frequently actuated, it allows for much more extensive testing, in the most extreme class the test is composed of 100,000 mechanical cycles and 4 thermal cycles. It does not specify a standardized test rig and instead, the test is carried out on an off the shelf valve. The test result should not be interpreted exclusively as a packing evaluation but as a valve evaluation.

Even though some packing manufacturers do offer low emissions technology warranties, identifying the compression packing after it has been used in the field and confirming it was a certified product compatible with fugitive emissions service is an open problem to this day. Packings are usually subjected to high compression, friction wear and contact with process fluid during operation, and end up with a significantly different structure, appearance, and composition. The most commonly used method in the industry to identify compression packing is through tags and labels. However, such external identifications can be moved, misplaced or accidentally destroyed, and when that happens, the information intended to enable identification of the compression packing being used is lost.

The low emissions rates mandated by the EPA and the previously mentioned fugitive emissions standards usually require a high packing installation stress. This is to ensure a low emission service even after system relaxation takes place during the equipment lifecycle. This high installation stress typically causes standard packings to extrude between the valve stem and the stuffing box. For soft packings, this can only be solved using anti-extrusion rings, which represents added cost and complexity.

Flexible graphite packings are the most common solution for low emissions, as they offer good sealability allied with low surface friction. Even with those positive properties, manufacturing can be challenging as flexible graphite tapes are very fragile and are not able to withstand the forces involved during the braiding process. Pure flexible graphite packings are therefore made with alternative processes, such as graphite molding, but packings made by those processes are not able to achieve the performance class required by fugitive emissions standard such as API 622.

For flexible graphite tape to resist the braiding process, reinforcements are used to increase its mechanical resistance. The most commonly used reinforcements are cotton, acrylic, fiberglass, and metal. Cotton and acrylic reinforcements are not suitable for low emissions technology, as they cannot withstand the temperatures of this type of application. Fiberglass reinforcement can resist high temperatures but is not able to achieve the performance required by the fugitive emissions standards. Metallic reinforcement is a significant improvement to the previous alternatives and is what is currently used by the state-of-the-art solutions for low-emission technology. This reinforcement has two main downsides, it further increases the friction generated by contact with the packing and can scratch the surface of the valve stem and create leak paths.

Metallic reinforced flexible graphite packings are a good fit for some applications, particularly very high temperature ones, but alone they are not able to achieve the performance required by the fugitive emissions standards. To achieve such low emissions levels, blocking agents are added as coatings to the packing. The most commonly used agent is polytetrafluoroethylene (PTFE), which not only helps with lowering the emissions but also acts as a lubricant, thus reducing friction. This still does not solve the problem of metallic reinforcement scratching the surface of the valve stem.

The above-mentioned blocking agents, however, are not fire or high-temperature resistant, and thus many standards and end-users strictly limit the amount of PTFE that may be added as a coating. For example, the American Society of Testing Materials ("ASTM") F2191 limits the PTFE coating to less than 5% in volume. API 622, specifically includes weight loss and fluorine content tests to be included in its final report for this reason. Controlling the PTFE content and keeping it to a minimum is important, because, all the lost mass due to its degradation under temperature is translated into system stress loss, and thus, potential leakage.

Hydrocarbon processing in refineries and petrochemicals requires packing to be fire-resistant. Standard API 607: Fire Test for Quarter-turn Valves and Valves Equipped with Nonmetallic Seats, Seventh Edition specifies fire type-testing requirements and a fire type-test method for confirming the pressure-containing capability of a packing sealed valve under pressure during and after the fire test. To be used in refineries and petrochemicals the packings must have this approval guaranteeing the ability of the packing to seal during a fire. Typically, flexible graphite packings are capable of attaining fire safety approval.

The use of these graphitic packing materials further requires special attention to the possibility of galvanic corrosion, an electrochemical reaction occurring between a metal and graphite or other carbon material, or between two different metals, that are submerged in an electrolyte. Under these conditions, corrosion of the material closer to the anodic end of the galvanic series may occur. The potential voltage difference among the materials will determine how fast corrosion will occur, with a larger difference yielding a faster corrosion rate.

Galvanic corrosion is associated with the use of compression packing when a carbon or graphite-based sealing element is used in equipment such as a valve having a metallic stem or shaft. Since steel is more anodic than graphite, when the valve is exposed to an electrolyte, such as in a hydrostatic test, the stem can face galvanic corrosion, facilitating the creation of leak paths.

SUMMARY OF THE INVENTION

The compression packing of the present invention carries particles that retain information of its fabrication and can be used to trace the packing. The tracer particles will resist severe application conditions with chemically aggressive fluids, abrasion, high pressures, and even elevated temperatures. The tracer particles provide a permanent identification method embedded in the compression packing that cannot be misplaced, switched off or lost. The tracer particles are much more reliable than the written and other currently available forms of identification being particularly useful for end-users that must ensure they are using a warrantied compression packing. Companies operating under an EPA consent decree for violation of the Clean Air Act are required to use low emission valve technology (including its compression packing assembly) and to issue a written warranty that their products will not emit fugitive emissions above a specific level and if they do so at any time within the first five years of service, they will replace the product. The present invention allows the identification of the warrantied packing itself avoiding claim complications that emerge from incorrect product identifications. Moreover, the present invention can be made extrusion resistant and compatible with fugitive emissions service without the use of any metallic reinforcement, as is common in the industry.

DETAILED DESCRIPTION

Reference is now made to the drawings that illustrate certain embodiments of the present invention. It should be understood that the invention is not limited to the embodiments shown in the drawings.

Figure 1:
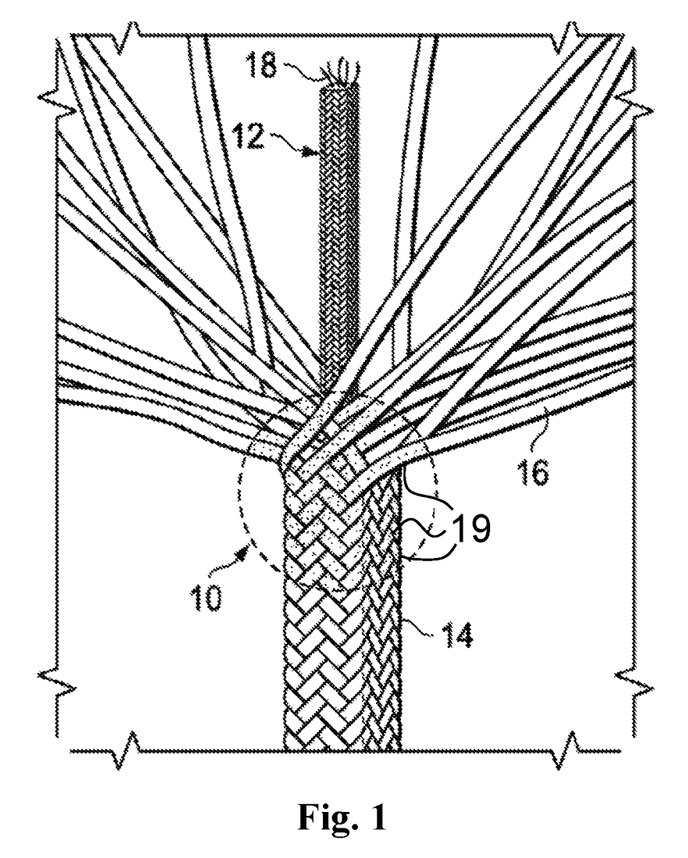
FIG. 1 illustrates a partially exploded view of an embodiment of the compression packing according to the present invention.

FIG. 1 illustrates a partially exploded view of an embodiment of the present invention. As shown in FIG. 1, the illustrated embodiment is a compression packing with anti-extrusion properties 10 which includes an interbraided core 12 made of a composite yarn that includes flexible graphite tape reinforced with a PTFE filament 16 with tracer particles, and an outer layer 14 of the PTFE filament 16. The flexible graphite tape is commercially available from many sources including Zhejiang Cathay Packing & Sealing Co Ltd of Puyang Industrial Zone Xiaoshan District Hangzhou, China. The PTFE filament may be produced by techniques well known to those of ordinary skill in the art such as by extruding PTFE resin through a die to result in a PTFE filament having a linear density of from about 30 to about 1100 denier. The flexible graphite tape may be reinforced with the PTFE filament by a technique well known to those of ordinary skill in the art such as by knitting, twisting or arranging the flexible graphite tape and the PTFE filament in a side-by-side orientation. While the tracer particles cannot be seen without the use of specific identification methods, for purposes of illustration only a dotted circle demarcates a region of the outer layer 14 which shows the distribution of tracer particles 19. A more detailed explanation of the available identification methods is set forth below. To inhibit galvanic corrosion, zinc wires 18 may be added to the interbraided core 12. Those of ordinary skill in the art will recognize that other corrosion inhibitors including passive corrosion inhibitors such as phosphate, barium molybdate and sodium molybdate may also be used. According to another embodiment, the PTFE filament includes a PTFE matrix and traceable particles wherein the traceable particles are distributed throughout the filament, and resist, friction, temperature, pressure and abrasion without loss of information.

Figure 2:
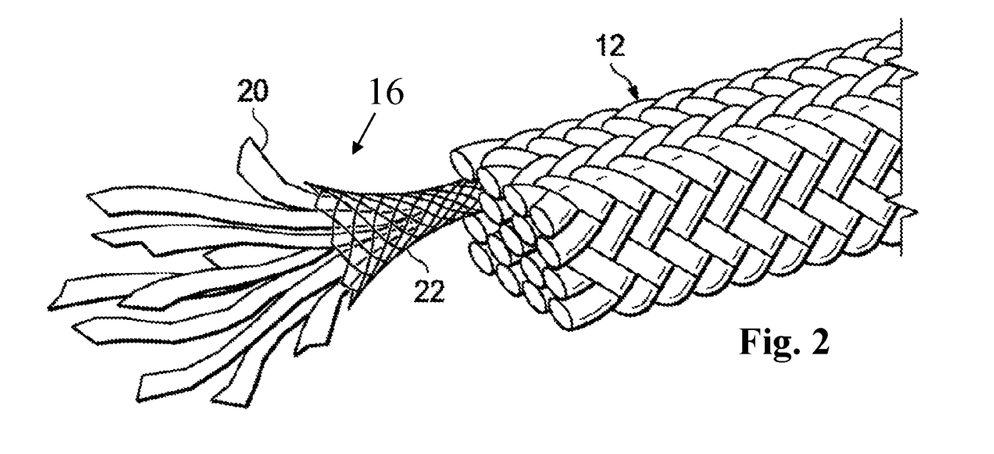
FIG. 2 illustrates a core made from flexible graphite tape reinforced with a PTFE filament with tracer particles.

FIG. 2 shows further details of the interbraided core 12. Specifically, the composite yarn 16 is shown as including a flexible graphite tape 20 that is reinforced with a PTFE filament 22 that includes tracer particles.

Figure 3:
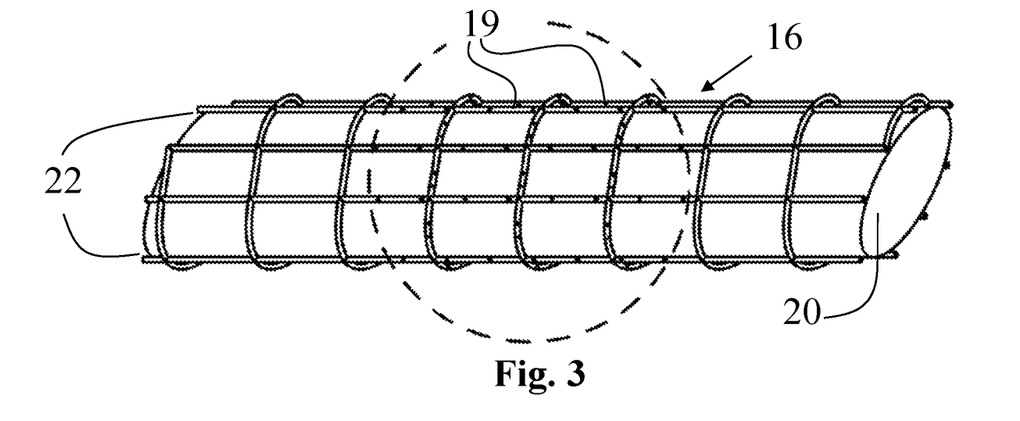
FIG. 3 illustrates a perspective view of an embodiment of the flexible graphite tape reinforced with a PTFE filament with tracer particles in a knitted configuration, showing the distribution of the tracer particles.

FIG. 3 shows an embodiment of the composite yarn 16 where the PTFE filament with tracer particles 22 is knitted as a jacket and used as a reinforcement for the flexible graphite tape 20. Attention is drawn to the tracer particles 19. Since flexible graphite tape 20 is extremely fragile, the PTFE filament with tracer particles 22 acts as a reinforcement and has the function of increasing the mechanical resistance of the composite yarn 16 so as to allow it to withstand the braiding process without degradation. Those of ordinary skill in the art will recognize that the PTFE filament with tracer particles 22 may be added as a reinforcement to the flexible graphite tape 20 in many other suitable ways.

The tracer particles 19 are added during the manufacture of the PTFE filament 22 and are distributed inside its polymer matrix. As noted above, since the tracer particles are not visible without the use of specific identification methods, FIG. 1 includes a dotted circle that demarcates a region of the outer layer 14 that shows the distribution of the tracer particles 19. While the distribution of the tracer particles 19 in the PTFE filament with tracer particles 22 is not shown in FIG. 2, those of ordinary skill in the art will recognize that the distribution of such tracer particles is similar to that shown in FIG. 1. The tracer particles 19 are resistant and will not be damaged so long as the compression packing 10 is used within its operational limits. If degradation occurs, it is an indication that the operational limits were exceeded.

The tracer particles 19 can be found in different forms and compositions. Suitable tracer particles 19 may include fluorophores, fluorescent dyes, phosphors, porous silicon and microdots. Even though they can differ slightly with regards to the mechanism used for identification, they are suitable for identifying the compression packing after service.

According to one embodiment, the tracer particles 19 are formed of fluorophores or fluorescent dyes. According to such an embodiment, suitable fluorophores include chalcogenides, such as selenides, sulfides and tellurides of metals such as cadmium, lead and zinc. Suitable fluorophores also include chemical compounds such as $C_{62}H_{87}N_{13}O_{16}$. Fluorophores are widely commercially available and are fluorescent chemical compounds that absorb light and re-emit light at a specific wavelength. The resulting wavelength of the re-emitted light is typically measured with a microscope equipped with a filter set for the particular fluorophore or fluorescent dyes of interest.

According to another embodiments, the tracer particles 19 take the form of phosphors. Phosphors are materials that absorb light in a wavelength range that is invisible to the naked eye and emit lights in the visible range. There are phosphors that absorb light in both the ultraviolet and infrared range and emit light in multiple colors including red, green and yellow. A specific suitable phosphor is upconverted hexagonal sodium yttrium fluoride ($\beta$-NaYF$_4$) which emits visible light in response to infrared excitation. The excitation with all phosphors can be effected with a portable laser pen or an ultraviolet flashlight, depending upon the selection of the phosphor.

According to another embodiment, the tracer particles 19 take the form of porous silicon (PS), which is silicon that includes synthetic nanopores added to its microstructure. The porous silicon can be made by methods well known to those of ordinary skill in the art such as by silicon wafer anodization and stain-etching. According to such an embodiment, the nanopores will reflect visible white light. The wavelength of the light is characteristic of the size of the nanopores and their topology in the silicon and can be measured with a standard spectrometer.

According to yet another embodiment, the tracer particles 19 take the form of microdots which are small discs that are typically made of ceramics, polymers and metals. The discs are inscribed, usually by laser, with a pattern of very small dots. The pattern of dots can later be retrieved for identification by inspecting one of the discs with a microscope or similar magnifying technology.

Tests were developed to evaluate the temperature resistance of the tracer particles 19 after the compression packing 10 is subjected to extreme temperatures. The test exposed the compression packing 10 with the tracer particles 19 to a temperature of 650° C. for 4 hours, which is the maximum temperature to which the compression packing 10 is expected to be subjected. After the test, the tracer particles 19 could still be identified.

Tests were developed to assess the chemical resistance of the tracer particles 19 after the compression packing 10 is subjected to extreme conditions. The test exposed the compression packing 10 to two different environments for 3 months each. The first was a 98% concentration solution of sulfuric acid ($H_2SO_4$) and the second a 50% concentration solution of sodium hydroxide (NaOH). After being subjected to both environments, the compression packing 10 still maintained its structure, and the tracer particles 19 could still be identified.

Tests were developed to evaluate the resistance of the tracer particles 19 in a high frequency valve operation, which is an abrasive operation. The test was executed according to the standard ISO 15848-1, where the compression packing 10 was subjected to 60,000 mechanical cycles and 3 thermal cycles up to 260° C. After the test, the compression packing 10 maintained its structure, and the tracer particles 19 could still be identified. The sealability aspects of this test are set forth below.

According to an embodiment, the PTFE filament 22 may be filled with materials such as, but not limited to, carbon black, graphite, barite, talc and other mineral fillers. The filler may be selected to achieve specific goals such as increasing the resistance of the PTFE filament 22 and thus braiding performance, decreasing the overall PTFE content or decreasing surface friction with, for instance, a valve stem. These fillers do not subtract or intervene with the application of the tracer particles 19 and may be included simultaneously. The PTFE filament 22 may furthermore be made thinner or thicker in relation to the flexible graphite tape 20, for applications where the PTFE content must be finely controlled. Exemplary embodiments have been successfully manufactured and braided with yarns having 4, 10, 16 and 21% of PTFE content, by varying the weight of the PTFE filament 22 in a knitted jacket configuration.

According to certain embodiments, the interbraided, round braided or square braided core 12 and the interbraided, round braided or square braided outer layer 14 is achieved by diagonally weaving the flexible graphite tape reinforced with a PTFE filament with tracer particles 19 in a crisscross manner from the surface of the core 12 or outer layer 14 through its body. Because of such interbraiding, the various strands of the composite yarns 16 are locked to each other, providing an overall solid integral structure that generally resists unraveling. The weaving pattern of such interbraiding, round braiding or square braiding evenly distributes the various strands of the composite yarns 16 throughout the core 12 and the outer layer 14, respectively, and yields an overall dense and flexible structure. The interbraiding in the illustrated embodiments of FIGS. 1 and 2 include composite yarns 16, but those of ordinary skill in the art of compression packing will understand that other materials, and other forms of these materials other than composite yarns, including tapes, ribbons, and others, may be used to make the interbraided core 12 and the interbraided outer layer 14.

Figure 4:
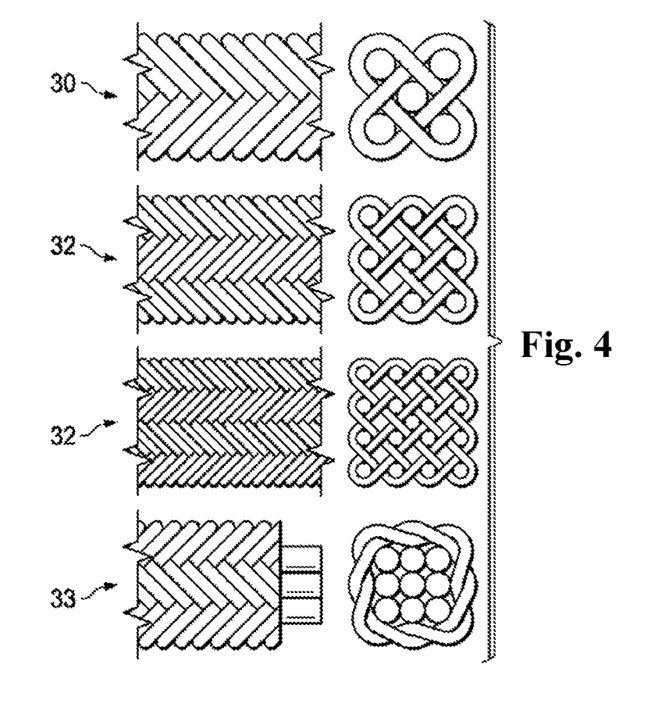
FIG. 4 is a schematic view of types of braiding (square braiding, interbraiding with 3-tracks, with 4-tracks and round braiding).

According to one embodiment for making the density-controlled core 12 so that it will have the desired density that will guarantee the anti-extrusion properties of the final packing, for the type of relatively small-size cross-section packings, such as those shown in FIGS. 1 and 4, the core includes a single interbraided or square braided core 12.

Figure 5:
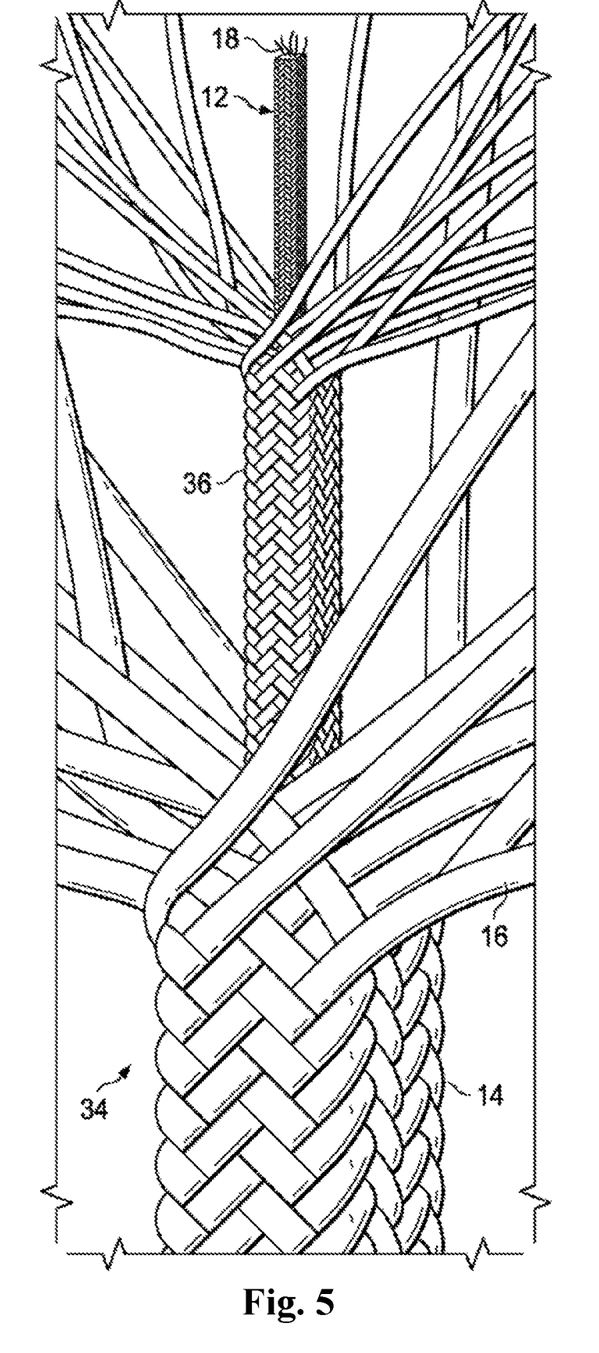
FIG. 5 illustrates an embodiment of the compression packing according to the present invention for larger size cross-section packings compared to the smaller size cross-section packings shown in FIG. 1.

As shown in FIG. 5, according to another embodiment for making the density controlled core so that it will have the desired density that will guarantee the anti-extrusion properties of the final packing, for relatively large-size cross-section packings, the packing 34 includes a core 12, an interbraided, round braided or square braided layer 36 disposed over an interbraided, round braided or square braided core 12 and an outer layer 14 made of a composite yarn 16 made of interbraided flexible graphite tape with a PTFE reinforced filament with tracer particles.

In certain embodiments of the present invention corrosion inhibitors may be added to inhibit galvanic corrosion. As shown in FIGS. 1, and 5, zinc wires 18 may be added to the core 12 to inhibit galvanic corrosion. Those of ordinary skill in the art will recognize that other corrosion inhibitors such as passive corrosion inhibitors including phosphate, barium molybdate and sodium molybdate may also be used.

Figure 6:
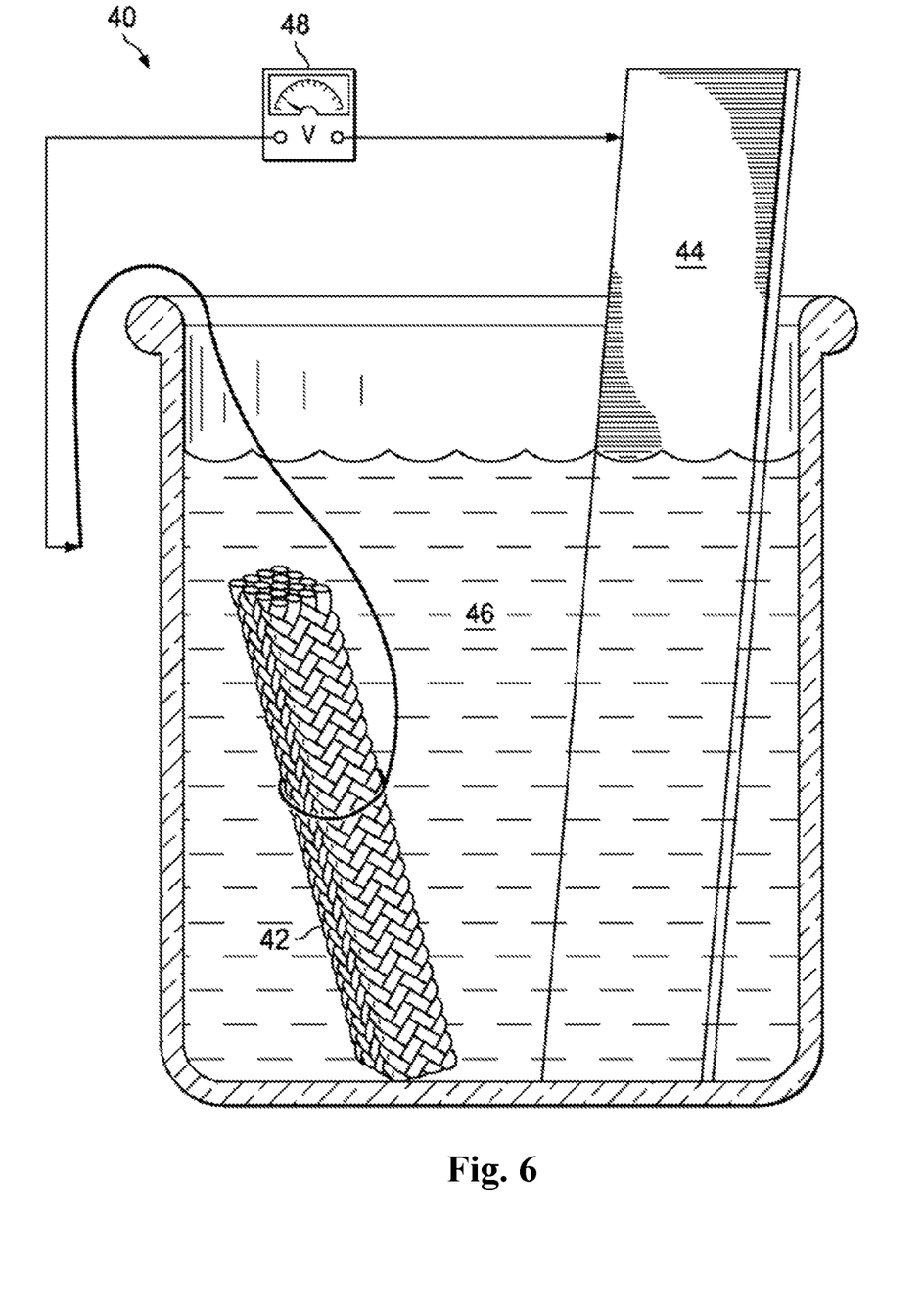
FIG. 6 is a schematic view of a galvanic cell used to evaluate corrosion inhibitor efficiency.
Figure 7:
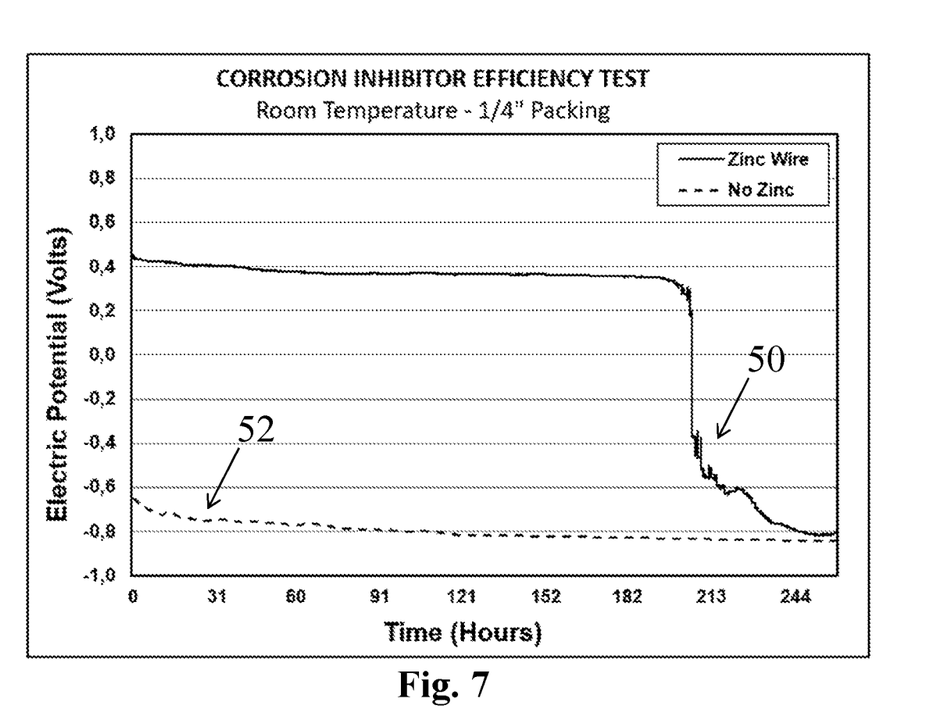
FIG. 7 illustrates comparative results of the efficiency of corrosion inhibitors when used in conjunction with the tracer particles.

Laboratory tests were developed to evaluate the efficiency of galvanic corrosion inhibitors, to determine if they would retain their original functionality with the tracer particles. For this test, an embodiment of the present invention with zinc wires as a corrosion inhibitor was compared to another embodiment without the zinc wires or any other type of corrosion inhibitor. As shown schematically in FIG. 6, the tests were conducted with a galvanic cell 40 where the compression packing 42 and a stainless-steel bar 44 act as electrodes. They were both immersed in an electrolyte solution 46 and were connected to a voltmeter 48 that recorded the electric potential difference between the packing 42 and the stainless-steel bar 44. The expected behavior of a working corrosion inhibitor, that is, protecting a valve stem from corrosion, is indicated by electrons moving from the packing 42 towards the stainless-steel bar 44. The direction of the flow of electrons can be determined by the voltage sign. As shown in FIG. 7, this test indicated that zinc wires were able to offer protection 50 as expected. Eventually, the zinc was consumed, which determines the point at which corrosion of the valve stem would begin, and this can be seen by a change in the direction of the electron flow. This result contrasts with the embodiment without corrosion inhibitors 52, in which the voltage sign indicates corrosion from the start of the test. This indicates that the tracer particles 19 do not interfere with corrosion inhibitor functionality and that zinc wires will serve as a suitable corrosion inhibitor in embodiments of the compression packing according to the present invention. Those of ordinary skill in the art will recognize that other corrosion inhibitors such as passive corrosion inhibitors including phosphate, barium molybdate and sodium molybdate may also be used.

According to certain embodiments of the present invention, the packing may include a coating of a lubricating agent, a blocking agent or both. Such blocking and lubricating agents may include any number of agents well known to those of ordinary skill in the art, such as animal fats, vegetable oils, PTFE, petroleum or mineral lubricants, synthetic lubricants, silicones, chlorofluorocarbons, graphite, paraffin, mica, tungsten disulfide, molybdenum disulfide, or greases. For instance, a compression packing according to the present invention was impregnated with PTFE representing less than 5% of the packing total volume. This coating is not necessary but can be added to further reduce packing friction.

Laboratory tests were designed to evaluate packing friction on an off-the-shelf control valve. This test measured packing friction when subject to different assembly stresses, to account for a different range of applications. This test had the goal of comparing a compression packing according the construction shown in FIG. 3, namely, a compression packing that was made of a flexible graphite tape reinforced with a PTFE filament with tracer particles in a knitted jacket configuration to a prior art compression packing made of a flexible graphite tape reinforced with a nickel-chromium yarn in a knitted jacket configuration for two different applications. The first application is when both packings do not include a PTFE coating, and the second application is when both packings include the same type of PTFE coating.

Figure 8:
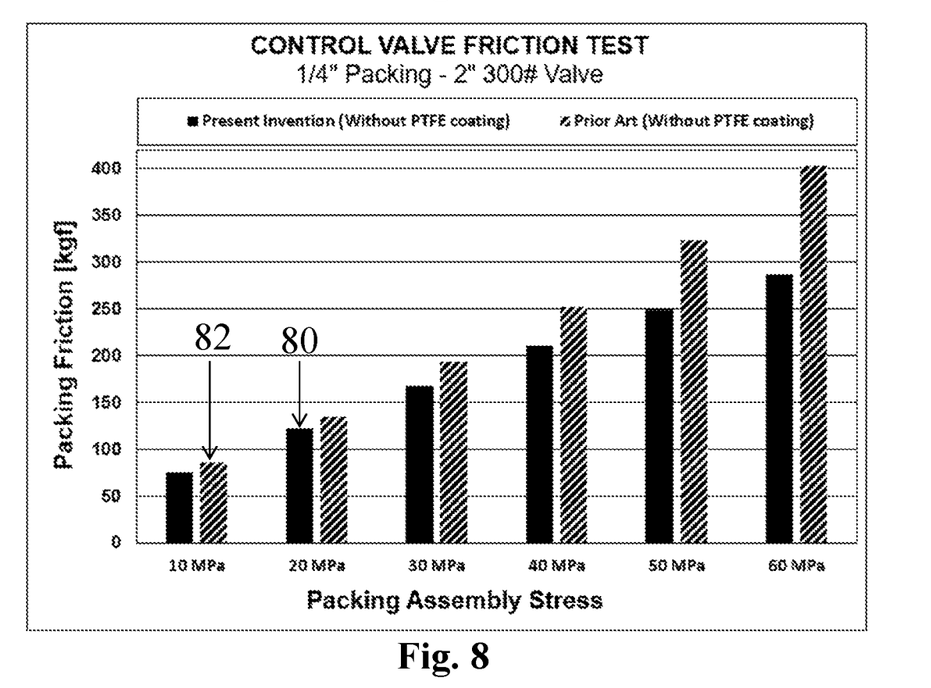
FIG. 8 illustrates the results of the control valve friction test, comparing an embodiment of the present invention with the current state-of-the-art, both without a PTFE coating.

FIG. 8 shows the results for the first application type, comparing the compression packing according to an embodiment 80 which had the construction shown in FIG. 3, namely, that the compression packing was made of a flexible graphite tape reinforced with a PTFE filament with tracer particles in a knitted jacket configuration and the prior art compression packing 82, which had a construction in which a flexible graphite tape was reinforced with a nickel-chromium yarn in a knitted jacket configuration, both without a PTFE coating. The results show that the compression packing according to the embodiment 80 had friction values, on average, 17% lower than the prior art compression packing 82.

Figure 9:
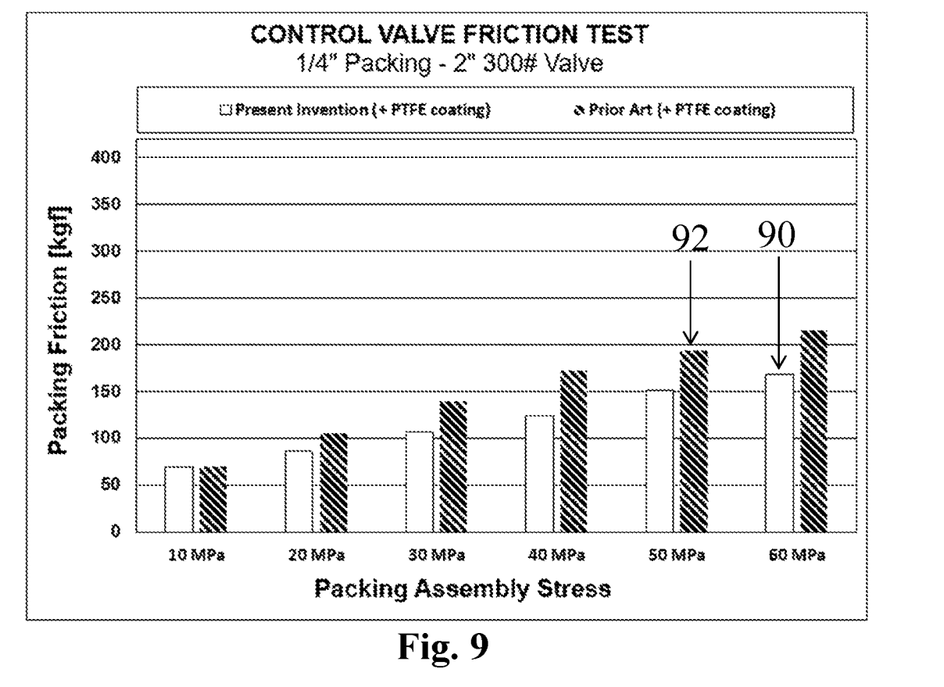
FIG. 9 illustrates the results of the control valve friction test, comparing an embodiment of the present invention with the current state-of-the-art, both with a PTFE coating.

FIG. 9 shows the results for the second application type, namely comparing the two packings discussed above but in which both packings had the same PTFE coating applied to them. The results show that the compression packing according to an embodiment 90 which had the construction shown in FIG. 3, namely, that the compression packing was made of a flexible graphite tape reinforced with a PTFE filament with tracer particles in a knitted jacket configuration had friction values, on average, 19% lower than the prior art compression packing 92, which had a construction in which a flexible graphite tape was reinforced with a nickel-chromium yarn in a knitted jacket configuration.

Figure 10:
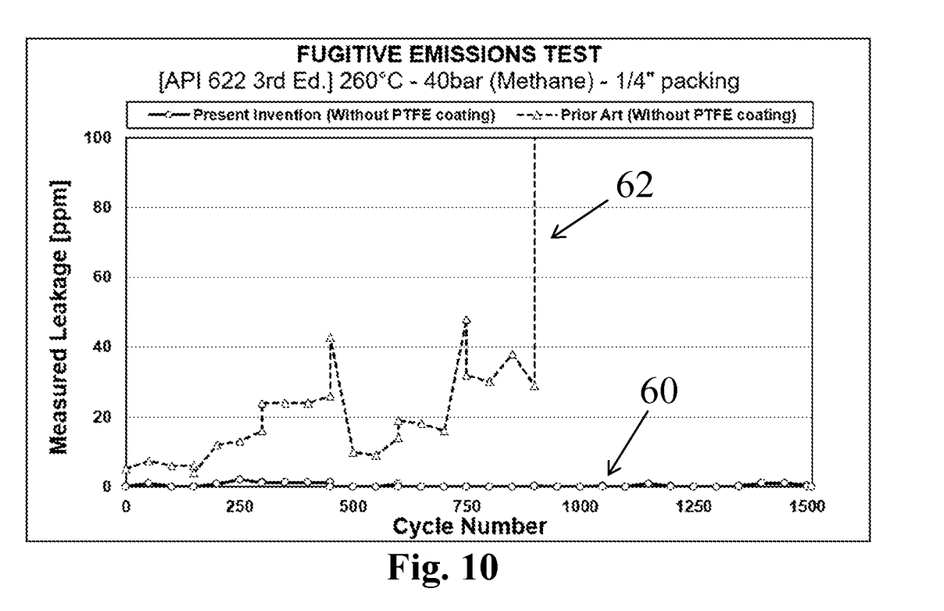
FIG. 10 illustrates the results of the API 622 fugitive emission test, comparing an embodiment of the present invention with the current state-of-the-art, both without a PTFE coating.

Laboratory tests were conducted following the procedure described in the fugitive emissions standard API 622. FIG. 10 shows the results for a compression packing according to an embodiment of the present invention 60, which had the construction shown in FIG. 3, namely, that the compression packing was made of a flexible graphite tape reinforced with a PTFE filament with tracer particles in a knitted jacket configuration, compared to a prior art compression packing 62, which had a construction which included flexible graphite tape reinforced with a nickel-chromium yarn in a knitted jacket configuration, both without a PTFE coating. The compression packing according to an embodiment of present invention 60 reached the approval criteria of the standard and had a lower leakage than the prior art compression packing 62. Furthermore, the prior art compression packing 62 failed the test at 950 mechanical cycles, when the measured leakage went above the allowable limit of 100 ppm.

Figure 11:
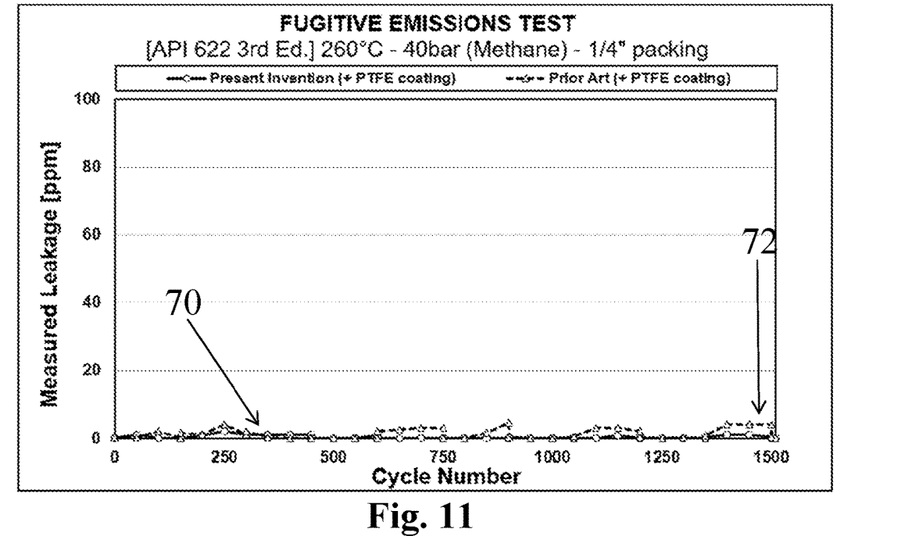
FIG. 11 illustrates the results of the API 622 fugitive emission test, comparing an embodiment of the present invention with the current state-of-the-art, both with a PTFE coating.

As shown in FIG. 11, further fugitive emissions testing according to API 622 was done comparing a compression packing according to an embodiment of the present invention 70, which had the construction shown in FIG. 3, namely, that the compression packing was made of a flexible graphite tape reinforced with a PTFE filament with the tracer particles in a knitted jacket configuration, and a prior art compression packing 72, which had a construction with included flexible graphite tape reinforced with a nickel-chromium yarn in a knitted jacket configuration, and in which both compression packings had a PTFE coating. Both packings reached approval criteria, and had similar performance, maintaining leakage well below the 100 ppm threshold. It is noted that for the prior art compression packing 72, a PTFE coating is necessary to stay under the 100 ppm threshold, whereas for the compression packing according to an embodiment of the present invention 70, a PTFE coating is not necessary to reduce leakage.

Figure 12:
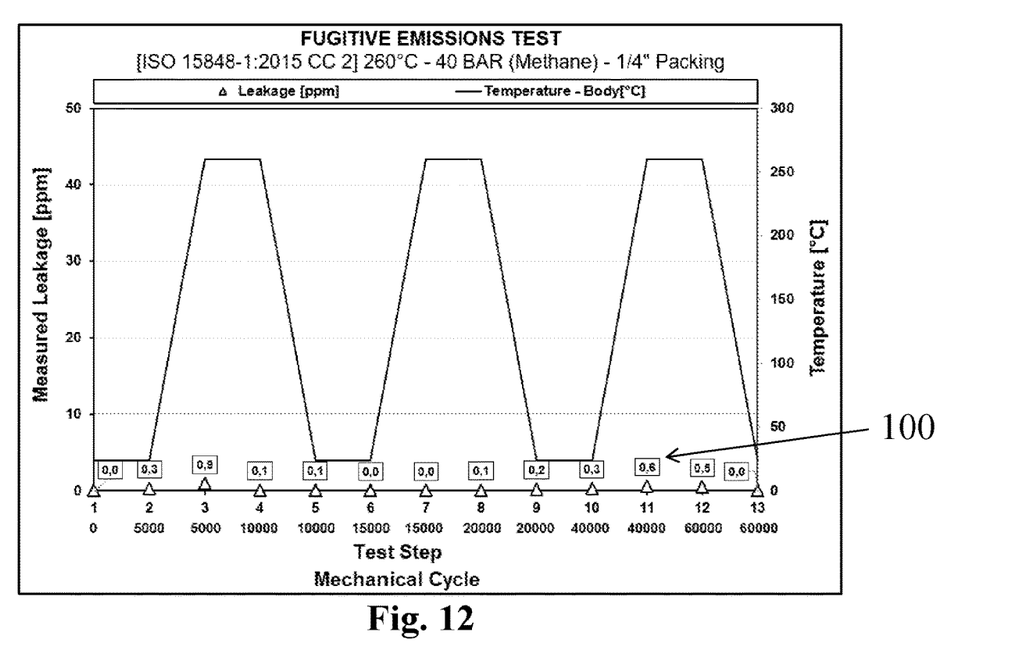
FIG. 12 illustrates the test results for the ISO 14848-1 fugitive emission test for an embodiment of the present invention.

Laboratory tests were conducted according to the fugitive emissions standard ISO 15848-1. For this test, an ASME B16.34 size 2 inches class 300 control valve was selected. The procedure followed endurance class CC2, which corresponds to 60,000 mechanical and 3 thermal cycles with the same temperature, pressure and test media described in API 622. The results are shown in FIG. 12, in which a compression packing according to embodiment 100 which had the construction shown in FIG. 3, namely, that the compression packing was made of a flexible graphite tape reinforced with a PTFE filament with tracer particles in a knitted jacket configuration, presented a leakage well below the 50 ppm required by the most restrictive tightness class in the standard, reaching approval criteria.

Laboratory fire tests were conducted simulating the standard API 607 Fire Safe. The tests were conducted in a rig that simulated the stuffing box of a 4" 300# valve. The test rig was placed in an oven at 1000° C. and the temperature was monitored, when the temperature reached 650° C. the heat was turned off. The rig was then removed from the oven, cooled down to ambient temperature, and pressurized with water at 40 bar. Leakage was collected for 5 minutes in this phase, and the maximum allowable leak rate for a valve of this size was 600 ml/min. Tests were performed with a compression packing according to an embodiment which had the construction shown in FIG. 3, namely, that the compression packing was made of a flexible graphite tape reinforced with a PTFE filament with tracer particles in a knitted jacket configuration and presented a leakage below the allowable leak rate, reaching approval criteria.

Figure 13:
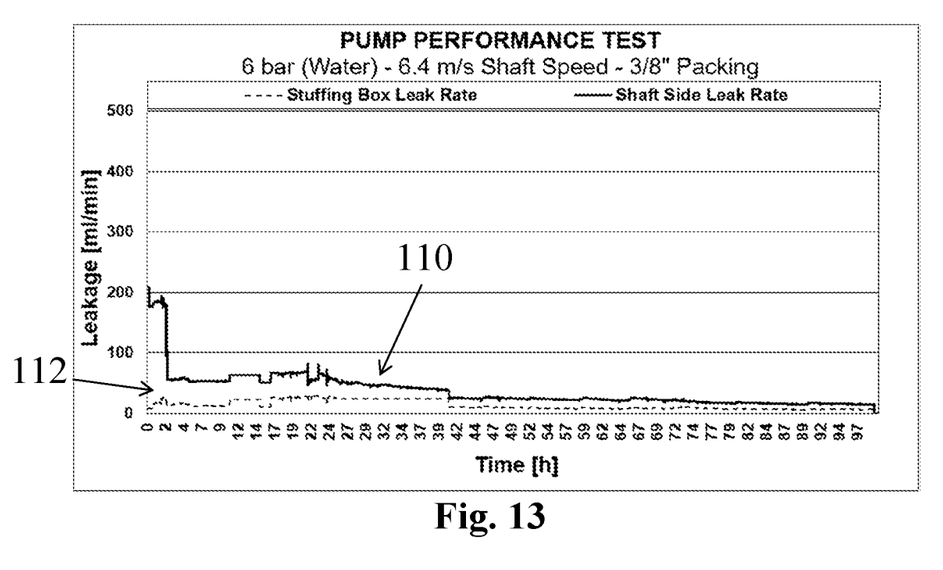
FIG. 13 illustrates the pump test results based on the standard EN 16752 for an embodiment of the present invention.

Compression packing according to an embodiment of the present invention was also tested in a pump application, which fundamentally differs from valve applications because the installation stresses are low and stem speed is significantly higher. For this, a test rig based on EN 16752: 2014 was used with a ⅜ inches packing cross-section size. The compression packing was subject to water pressurized at 6 bar for a total of 100 hours with a shaft speed of 1750 rpm (6.4 m/s). The test results are shown in FIG. 13, where fluid leakage was collected and measured separately for the shaft side 110 and stuffing box side 112. The tested compression packing embodiment of the present invention, had the construction shown in FIG. 3, namely, that the compression packing was made of a flexible graphite tape reinforced with a PTFE filament with tracer particles in a knitted jacket configuration with no PTFE coating. The compression packing had, on average, a leakage of 37 ml/min throughout the test. This is not a test applicable to the current fugitive emissions state-of-the-art metallic reinforced packings alternatives for valves since the high rotational speed coupled with the fact that pump shafts are usually softer than valve stems, would result in immediate damage to the equipment, and thus, creation of a leak path. This test result was unexpected and allows the packing to be a flexible sealing solution, being applicable not only for valves but also for pumps.

The above-described embodiments of the compression packing of the present invention were developed to enable fugitive emissions service and to resist high installation stresses without extruding and without the need for metallic reinforcements, a common practice in the industry. The lack of metallic reinforcements does not detract from the sealability performance, lowers operational friction as shown in FIG. 8 and FIG. 9 and eliminates the possibilities of stem and shaft damage or chipping. The above-described embodiments of the compression packing of the present invention carry tracer particles that enable the compression packing to retain information of its fabrication and can be used to trace the origins of the compression packing. The tracer particles are added directly to a PTFE filament during its fabrication. This PTFE filament can then be added to the compression packing in various forms and configurations. For instance, the PTFE filament with the tracer particles can be added as a single filament in the core of the compression packing exclusively for its tracking properties, whereas the rest of the compression packing is made with fugitive emissions compatible materials. The PTFE filament with the tracer particles can be twisted around a conventional flexible graphite tape, which gives the packing traceable properties and provides mechanical resistance to the flexible graphite tape which enables it to resist the destructive forces encountered in the braiding process. The PTFE filament with the tracer particles can be used in the form of a knitted mesh around a conventional flexible graphite tape, giving the compression packing traceable properties, extrusion resistance and provides mechanical resistance to the flexible graphite tape which enables it to be braided. The PTFE filament with the tracer particles can be used without the flexible graphite tape, similar to conventional PTFE packing but with additional traceable properties. Examples include using the PTFE filament with the tracer particles to entirely braid the packing or extruding the PTFE with the particles directly in the size of the stuffing box. The tracer particles are resistant to regular applications, such as abrasion, mechanical deformation, chemical attack, and elevated temperature, as shown by the multiple tests described above. Because of this, the tracer particles constitute a permanent identification method and therefore are much more reliable than the currently available forms of identification, since the tracer particles will not get lost or misplaced. This is particularly useful for end-users who need to ensure they are using a warrantied compression packing capable of meeting fugitive emissions requirements, such as users under consent decrees with the EPA for violation of the Clean Air Act. Furthermore, embodiments of the prevent invention meet the approval criteria of tests performed in a laboratory following the procedures of the API 622 and ISO 15848-1 fugitive emissions standards. As an additional application, since the compression packing of the present invention described above does not damage the shaft and has a soft exterior, it can be successfully used to control leakage in pump and dynamic applications, as shown on a laboratory test based on EN16752.

It is understood that variations may be made in the foregoing without departing from the scope of the disclosure.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "left," "right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures. In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those of ordinary skill in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures.

What is claimed is:

1. A filament comprising;
a polytetrafluoroethylene (PTFE) matrix; and
tracer particles selected from fluorophores and fluorescent dyes;
wherein the tracer particles absorb light and emit light at a specific wavelength that is detectable by a microscope equipped with a filter set for the particular tracer particles; and
wherein the tracer particles are distributed throughout the matrix.

2. The filament of claim 1, further comprising a mineral or synthetic filler selected from barite, graphite and carbon black.

3. A composite yarn comprising:
a flexible graphite tape; and
a PTFE filament comprising a PTFE matrix and tracer particles;
wherein the flexible graphite tape is reinforced with the PTFE filament by a method selected from knitting, twisting or arranging the flexible graphite tape and the PTFE filament in a side-by-side orientation.

4. A compression packing for sealing valve stems and pump shafts comprising a filament that includes a PTFE matrix and tracer particles.

5. The compression packing of claim 4, comprising a core and an outer layer wherein the core and the outer layer comprise one or both of the filament that includes a PTFE matrix and tracer particles and a flexible graphite tape reinforced filament that includes a PTFE matrix and tracer particles.

6. The compression packing of claim 4, further comprising a lubricating agent.

7. The compression packing of claim 4, further comprising a blocking agent.

8. The compression packing of claim 4, further comprising a blocking and a lubricating agent.

9. The compression packing of claim 6, wherein the lubricating agent is one or more of graphite, paraffin, silicone, mineral oil, greases, animal fats, vegetable oils, petroleum or mineral lubricants, synthetic lubricants, chlorofluorocarbons, mica, tungsten disulfide, and molybdenum disulfide.

10. The compression packing of claim 8, wherein the lubricating agent and blocking agent are added in the form of a PTFE impregnation.

11. The compression packing of claim 4, further comprising an active corrosion inhibitor.

12. The compression packing of claim 11, wherein the active corrosion inhibitor comprises zinc.

13. The compression packing of claim 12, wherein the active corrosion inhibitor comprises zinc wire.

14. The compression packing of claim 4, further comprising a passive corrosion inhibitor.

15. The compression packing of claim 14, wherein the passive corrosion inhibitor is selected from phosphate, barium molybdate and sodium molybdate.

16. A filament comprising:
a polytetrafluoroethylene (PTFE) matrix; and
phosphor tracer particles, wherein the tracer particles are distributed throughout the matrix and absorb light in a wavelength range that is invisible and emit light in the visible range.

17. A filament comprising:
a polytetrafluoroethylene (PTFE) matrix; and
porous silicon tracer particles distributed throughout the matrix,
wherein the porous silicon tracer particles have synthetic nanopores, wherein the nanopores reflect visible white light.

18. A filament comprising:
a polytetrafluoroethylene (PTFE) matrix; and
microdot tracer particles distributed throughout the matrix,
wherein the microdot tracer particles can be identified by microscopy.

* * * * *